United States Patent [19]
Honmou

[11] Patent Number: 5,877,853
[45] Date of Patent: Mar. 2, 1999

[54] METHOD OF EVALUATING AN OPTICAL TRANSMISSION PATH

[75] Inventor: Hiroshi Honmou, Tokyo, Japan

[73] Assignee: NEC Corporation, Tokyo, Japan

[21] Appl. No.: 831,406

[22] Filed: Apr. 1, 1997

[30] Foreign Application Priority Data

Apr. 2, 1996 [JP] Japan ................................. 8-079802

[51] Int. Cl.$^6$ ......................................................... G01J 1/00
[52] U.S. Cl. ............................................................... 356/122
[58] Field of Search ..................................... 356/121, 122, 356/124, 125, 363, 345, 73.1; 388/35, 33, 31

[56] References Cited

FOREIGN PATENT DOCUMENTS

| | | |
|---|---|---|
| 57-39015 | 3/1982 | Japan . |
| 1-224709 | 9/1989 | Japan . |
| 5-224098 | 9/1993 | Japan . |

OTHER PUBLICATIONS

Sollid et al; "Lensless Method . . . Divergence" Applied Optics vol. 17, No. 22 Nov. 15, 1978 pp. 3527–3529.

*Primary Examiner*—K P Hantis
*Attorney, Agent, or Firm*—Scully, Scott Murphy and Presser

[57] ABSTRACT

A method of measuring the radius of curvature of the convex tip of a core protruding from the end of an optical transmission path is disclosed. The transmission path is implemented by an optical fiber. A measuring unit accommodating a condenser and an infrared camera is located to face the convex tip of the core. A semiconductor laser is connected to the end of the fiber remote from the convex tip. A laser beam issuing from the convex tip of the core is once condensed by the convex tip. The measuring unit determines the condensing point of the beam, and then measures the distance between the condensing point and the convex tip. Subsequently, after the space between the convex tip and the condenser has been filled with a medium different in refractive index from air, the measuring unit again measures the above distance. The radius of curvature of the convex tip is determined on the basis of a difference or a radio between the measured distances.

6 Claims, 2 Drawing Sheets

METHOD OF EVALUATING AN OPTICAL TRANSMISSION PATH

BACKGROUND OF THE INVENTION

The present invention relates to a method of evaluating an optical transmission path to be coupled to an optical device for optical communication.

To connect an optical transmission path to an optical device efficiently, use may be made of an optical fiber whose core is provided with a convex tip, as taught in, e.g., Japanese Patent Laid-Open Publication No. 5-224098 (Prior Art 1 hereinafter). In Prior Art 1, the end portion of an optical fiber is etched to bare a core and then heated to configure the core as a convex tip. The convex tip, playing the role of a lens, transforms the image magnification and thereby implements efficient coupling between the fiber and an optical device. Specifically, in Prior Art 1, the fiber whose core has the convex tip is located on the optical axis of a laser beam to issue from a semiconductor laser (optical device) and having a wavelength of 1.55 μm, while adjoining the laser. The fiber is a single mode fiber having an outside diameter of 125 μm, and a core whose diameter is 5 μm. The convex tip protrudes from the end of the fiber by 10 μm, and has a radius of curvature of about 5 μm. The dopant content in the core sequentially decreases in a square distribution with respect to the distance from the center due to thermal diffusion occurred during fabrication. It follows that by etching the flat end of the fiber with an etching liquid whose etching speed decreases with an increase in dopant content, it is possible to provide the core of the fiber with the convex tip at low cost.

Japanese Patent Laid-Open Publication No. 1-224709 (Prior Art 2 hereinafter) discloses a fiber with a convex tip and a method of producing the same. In Prior Art 2, a transparent cylindrical rod-like member having a convex end is adhered to the end of an optical fiber. The distance between the plane of adhesion and the convex tip of the rod and the radius of curvature of the tip are selected such that light is output from the tip in the form of a parallel beam. This kind of scheme facilitates the alignment of the fiber and allows the distance between such fibers to be increased. Specifically, the rod-like member adhered to the end of the fiber allows a desired distance and radius of curvature and therefore a desired beam condition to be selected. Assume that the fiber with the convex tip and having a desired distance and radius of curvature is applied to a fiber type optical circuit. Then, because light is output in the form of a parallel beam, a coupling loss can be maintained extremely low even if the fiber is dislocated in the direction of its optical axis. Consequently, the fiber can be positioned extremely easily in the direction of the optical axis, allowing the distance between such fibers to be increased.

Japanese Utility Model Laid-Open Publication No. 57-39015 (Prior Art 3 hereinafter) proposes a single mode optical fiber with a convex tip implementing efficient coupling stably. The fiber of Prior Art 3 has most of its clad removed at at least one end portion, and has its core configured as a convex tip. With this scheme, it is possible to align the core and convex tip automatically, and to control the radius of curvature of the convex tip relatively desirably on the basis of, e.g., the etching time and heating conditions. This successfully enhances the yield of the coupling portions of single mode fibers.

In any case, evaluating the radius of curvature of a core protruding from the end of a fiber and having a convex tip is essential when it comes to the efficient optical coupling of the fiber with an optical device. Because image magnification depends on the radius of curvature of the convex tip of the core, an optical fiber or similar optical transmission path whose convex tip has a radius of curvature different from a designed radius cannot be coupled to an optical device with a desired efficiency.

However, the convex tip of the core has a radius of curvature which is generally as small as several microns to several ten microns. It is therefore difficult to directly measure the radius of curvature without any error. This prevents an optical fiber or similar optical transmission path whose convex tip has a desired radius of curvature from being selected, resulting in irregular optical coupling with an optical device. None of Prior Art 1 though Prior Art 3 teaches a method of evaluating the radius of curvature of the convex tip of the core protruding from end of the fiber.

SUMMARY OF THE INVENTION

It is therefore an object of the present invention to provide a method capable of evaluating an optical transmission path easily with a simple arrangement.

It is another object of the present invention to provide a method capable of evaluating the radius of curvature of the convex tip of a core protruding from the end of an optical transmission path with ease.

In accordance with the present invention, in a method of evaluating an optical transmission path, a distance between a position where the wave front of light issuing from the end of a core of the optical transmission path has a substantially infinite radius of curvature and a position where the end of the core is located is measured.

Also, in accordance with the present invention, a method of evaluating an optical transmission path includes the step of measuring, in a first medium, a first distance between a position where the wave front of light issuing from the end of a core of the optical transmission path has a substantially infinite radius of curvature and a position where the end of the core is located. Then, in a second medium, a second distance between the position where the wave front has the substantially infinite radius of curvature and the position where the end of the core is located is measured. Subsequently, the radius of curvature of the end of the core is determined on the basis of the first and second distances measured.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

Generally, a light beam issues from the convex end of an optical transmission path at any angle determined by the radius of curvature of the convex end. The beam issuing from the path at any angle converges at a position where the radius of curvature of its wave front becomes substantially infinite. Stated another way, the condensing point is determined in accordance with the radius of curvature of the convex end. A definite correlation exists between a distance Z from the convex end to the condensing point and the radius of curvature R of the convex end, as follows. So long as the radius of curvature R is relatively small, the distance Z increases with an increase in the radius R. When the radius R is relatively great, the distance Z decreases with an increase in the radius R. If the range of the size of the radius R can be estimated on the basis of the above correlation, it is possible to produce the radius R from the distance Z by measuring the distance Z in a medium having any desired refractive index, e.g., air. If the radius R cannot be estimated beforehand, the distances Z may be sequentially measured in two or more media different in refractive index, e.g., air and a solvent and then compared (subtraction or division) in order to determine the radius R.

An evaluation method in accordance with the present invention stems from the above fact.

Figure 1:
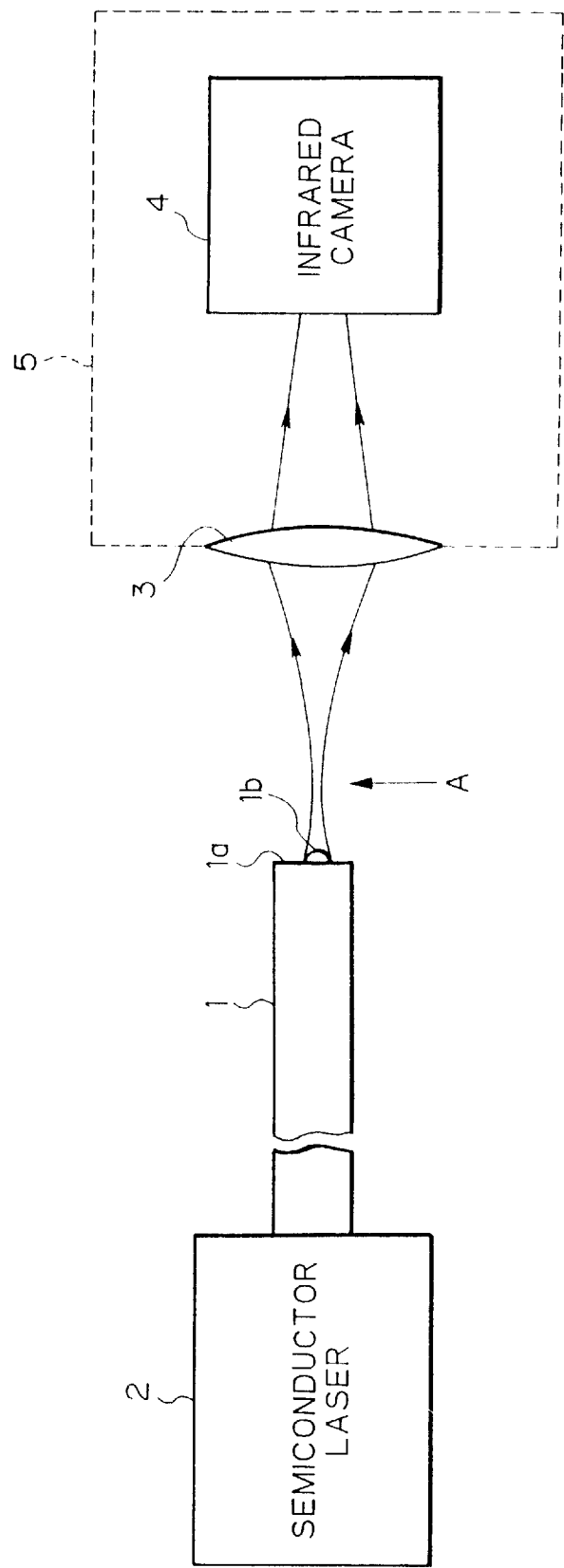
FIG. 1 is a block diagram schematically showing a system arrangement representative of a method embodying the present invention.

Referring to FIG. 1 of the drawings, an evaluation method embodying the present invention is shown in a system configuration. As shown, the system has an optical transmission path 1, a semiconductor laser 2 having an oscillation wavelength of 1.3 $\mu$m, and a measuring unit 5 accommodating a condensing lens or condenser 3 and an infrared camera 4. The transmission path 1 consists of a core having a great refractive index and a clad having a small refractive index and surrounding the core, as viewed in a cross-section, as well known in the art. In the illustrative embodiment, the transmission path 1 is implemented as a single mode optical fiber whose core has a diameter of 10 $\mu$m. The fiber 1 is connected to the semiconductor laser 2 at one end thereof. At the other end, labeled 1a, only the core of the fiber 1 is provided with a convex tip 1b. The measuring unit 5 is located to face the convex tip 1b.

In operation, a laser beam issuing from the laser 2 is propagated through the transmission path 1 and then output via the convex tip 1b. The beam output from the transmission path 1 converges at a point A where the radius of curvature of its wave front becomes substantially infinite in accordance with the radius of curvature of the convex tip 1b. Subsequently, the beam is focused onto the infrared camera 4 by the condenser 3. The measuring unit 5 measures the distance Z from the convex tip 1b to the converging point A on the basis of the distance between the condenser 3 and the camera 4. Even when the space between the convex tip 1b and the condenser 3 is filled with media each having a particular refractive index, the distance Z can be measured by a method similar to the above method.

For experiment, use was made of an optical fiber 1 having a convex tip 1b whose designed radius of curvature was 10 $\mu$m. In this condition, the distance Z from the convex tip 1b to the condensing point A was measured to be 10 $\mu$m when the medium was air, or 31 $\mu$m when the medium was a solvent having a refractive index of 1.29.

Figure 2:
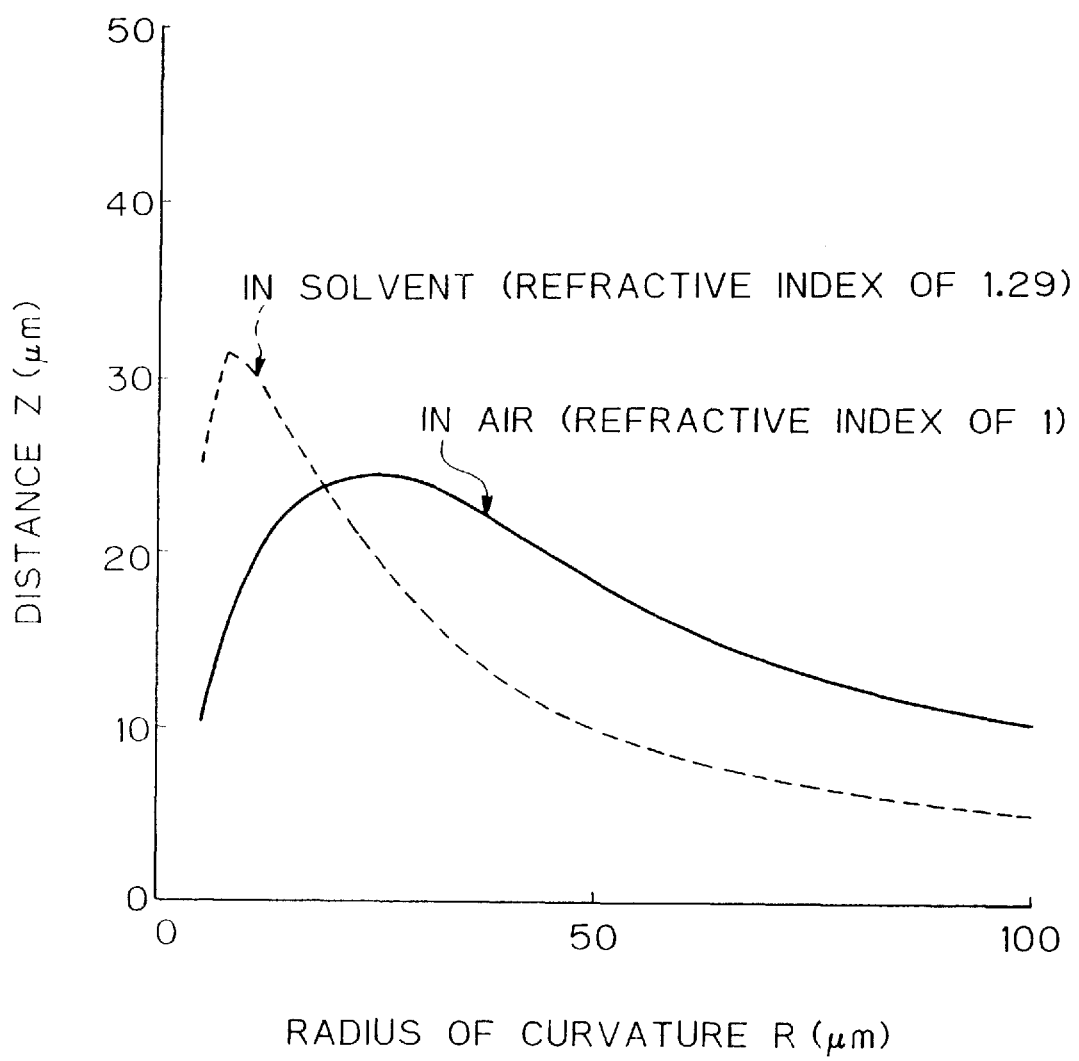
FIG. 2 is a graph showing a relation between a distance Z between the convex tip of a core and a condensing point A and the radius of curvature R of the convex tip.

FIG. 2 is a graph showing a relation between the distance Z and the radius of curvature Z with respect to air (refractive index of 1) and the solvent (refractive index of 1.29). In the graph, the ordinate and abscissa respectively indicate the radius of curvature R ($\mu$m) and distance Z ($\mu$m). As FIG. 2 indicates, when the radius R is relatively small, the distance Z increases with an increase in the radius R. When the radius R is relatively great, the distance Z decreases with an increase in the radius R. With this graph, the convex tip 1b was successfully determined to have the designed radius R of 10 $\mu$m.

The illustrative embodiment uses the measuring unit 5 having the condenser 3 and infrared camera 4 therein. Alternatively, a reflector may be mounted on the convex tip 1b and positioned parallel to the direction perpendicular to the optical axis of the fiber 1. In such a case, the beam issuing from the convex tip 1b will be reflected by the reflector and returned to the fiber 1, so that the distance Z can be determined in terms of the quantity of light returned to the fiber 1. Specifically, because the wave front of the beam has substantially an infinite radius of curvature at the point A, the distance between the convex tip 1b and the reflector at the time when the maximum quantity of light is returned to the fiber 1 corresponds to the above distance Z. This kind of scheme is capable of reducing the size of the measuring unit.

In summary, it will be seen that the present invention provides an evaluation method capable of determining the radius of curvature of an optical transmission path, which can be optically coupled to an optical device in a desirable manner, easily and accurately. In addition, the method of the present invention is practicable with a simple evaluation system.

Various modifications will become possible for those skilled in the art after receiving the teachings of the present disclosure without departing from the scope thereof. For example, the single mode fiber used in the embodiment may be replaced with a multimode fiber whose core has a diameter of about 50 $\mu$m. Of course, the present invention is practicable even with an optical waveguide using quartz or a semiconductor and playing the same role as the fiber. While the fiber included in the embodiment has only its core worked to have a convex tip, it may be replaced with a fiber whose tip, including a clad, is machined in a conical configuration.

What is claimed is:

1. A method of evaluating an optical transmission path, which comprises a core surrounded by a clad having a refractive index which is less than the refractive index of the core, comprising determining a radius of curvature R of an end of the core by measuring a distance between a position where a wave front of light issuing from an end of said core of said optical transmission path has a substantially infinite radius of curvature and a position where said end of said core is located.

2. A method as claimed in claim 1, wherein measurement of said distance is effected by use of at least two media each having a particular refractive index.

3. A method as claimed in claim 1, wherein said end of said core is implemented as a convex tip.

4. A method of evaluating an optical transmission path, which comprises a core surrounded by a clad having a refractive index which is less than the refractive index of the core, comprising determining a radius of curvature R of an end of the core by the steps of:

(a) measuring, in a first medium, a first distance between a position where a wave front of light issuing from an end of said core of said optical transmission path has a substantially infinite radius of curvature and a position where said end of said core is located;

(b) measuring, in a second medium, a second distance between said position where said wave front has the substantially infinite radius of curvature and said position where said end of said core is located; and (c) determining the radius of curvature of said end of said core on the basis of said first and second distances measured.

5. A method as claimed in claim 4, wherein step (c) comprises (d) determining the radius of curvature of said end of said core on the basis of a difference between said first distance and said second distance.

6. A method as claimed in claim 4, wherein step (c) comprises (d) determining the radius of curvature of said end of said core on the basis of a ratio between said first distance and said second distance.

* * * * *

UNITED STATES PATENT AND TRADEMARK OFFICE
CERTIFICATE OF CORRECTION

PATENT NO. : 5,877,853
DATED : March 2, 1999
INVENTOR(S) : Hiroshi Honmou

It is certified that error appears in the above-identified patent and that said Letters Patent is hereby corrected as shown below:

<u>Title page,</u>
Item [56], Line 2, insert the following:

```
--                  U.S. PATENT DOCUMENTS
5,268,786   12/7/93      Matsushita, et al…………………..359/341
5,463,487   10/31/95     Epworth…………………………...359/124
5,600,473   2/4/97       Huber……………………………..359/174
5,392,154   2/21/95      Chang et al……………………….359/349
5,510,926   4/23/96      Bayart, et al……………………...359/179
5,680,247   10/21/97     Okuno…………………………....359/341 --
```

Item [56], under the section "FOREIGN PATENT DOCUMENTS", insert the following:
-- 2294170   4/17/96     Gt. Britain --

Item [56], under the section "OTHER PUBLICATIONS", insert the following:
-- Nahabayashi et al., Technical Report of IE ICE. OC594-66, OPE 94-89, PP 1994-11 --

Signed and Sealed this

Sixteenth Day of July, 2002

Attest:

JAMES E. ROGAN
Attesting Officer       Director of the United States Patent and Trademark Office